US011553728B2

United States Patent
Bouwens et al.

(10) Patent No.: US 11,553,728 B2
(45) Date of Patent: Jan. 17, 2023

(54) SAVOURY CONCENTRATE

(71) Applicant: Conopeo Inc., Englewood Cliffs, NJ (US)

(72) Inventors: Elisabeth Cornelia Maria Bouwens, Vlaardingen (NL); Leonardus Marcus Flendrig, Vlaardingen (NL); Hendrikus Theodorous W. M. van der Hijden, Vlaardingen (NL); Marc Lemmers, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 16/955,082

(22) PCT Filed: Nov. 26, 2018

(86) PCT No.: PCT/EP2018/082548
§ 371 (c)(1),
(2) Date: Jun. 18, 2020

(87) PCT Pub. No.: WO2019/120892
PCT Pub. Date: Jun. 27, 2019

(65) Prior Publication Data
US 2020/0383363 A1 Dec. 10, 2020

(30) Foreign Application Priority Data
Dec. 20, 2017 (EP) ..................... 17208979

(51) Int. Cl.
A23L 23/10 (2016.01)
A23L 29/00 (2016.01)
A23L 33/13 (2016.01)
A23L 29/30 (2016.01)
A23L 33/105 (2016.01)
A23L 33/115 (2016.01)

(52) U.S. Cl.
CPC ............. *A23L 23/10* (2016.08); *A23L 29/035* (2016.08); *A23L 29/30* (2016.08); *A23L 33/105* (2016.08); *A23L 33/115* (2016.08); *A23L 33/13* (2016.08)

(58) Field of Classification Search
CPC ........ A23L 23/10; A23L 29/035; A23L 33/13; A23L 29/30; A23L 33/105; A23L 33/115
USPC ....................................................... 426/589
See application file for complete search history.

(56) References Cited

U.S. PATENT DOCUMENTS

2015/0335054 A1 * 11/2015 van der Hijden ..... A23L 29/231
426/577

FOREIGN PATENT DOCUMENTS

| EP | 1962619 | 9/2010 | |
| EP | 2468110 | 6/2012 | |
| WO | WO2007068402 | 6/2007 | |
| WO | WO2007068483 | 6/2007 | |
| WO | WO2007068484 | 6/2007 | |
| WO | WO2012062919 | 5/2012 | |
| WO | WO2012097930 | 7/2012 | |
| WO | 2014/009079 A1 | 1/2014 | |
| WO | WO-2015091220 A1 * | 6/2015 | ............. A23L 23/00 |
| WO | WO-2015128155 A1 * | 9/2015 | ........... A23L 29/206 |
| WO | WO2017001154 | 1/2017 | |
| WO | 2017/021069 A1 | 2/2017 | |
| WO | 2017/186514 A1 | 11/2017 | |
| WO | 2017/186558 A1 | 11/2017 | |

\* cited by examiner

*Primary Examiner* — Brent T O'Hern
(74) *Attorney, Agent, or Firm* — N.V. Nederlandsch Octrooibureau

(57) ABSTRACT

The invention provides a savoury concentrate comprising:
a) at least 30 wt. %, by weight of the concentrate, of an oil phase comprising liquid oil;
b) 3-30 wt. %, by weight of the concentrate, of edible salt selected from sodium chloride, potassium chloride and combinations thereof;
c) 1-50 wt. %, by weight of the concentrate, of savoury taste giving ingredients selected from glutamate, 5'-ribonucleotides, sucrose, glucose, fructose, lactic acid, citric acid and combinations thereof;
d) up to 10 wt. %, by weight of the concentrate, of water; and
e) particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 µm and 500 µm;

wherein the particulate anhydrous non-defibrillated cell wall material is dispersed in the oil phase in a concentration of 0.05 to 15 wt. %, by weight of the liquid oil.

The particulate anhydrous non-defibrillated cell wall material from parenchymal pant tissue and/or stem tissue of monocotyledon plants is capable of forming an oil-retaining matrix within the liquid oil and thereby minimize oil exudation.

9 Claims, No Drawings

SAVOURY CONCENTRATE

FIELD OF THE INVENTION

The present invention relates to savoury concentrates comprising oil, edible salt, savoury taste giving ingredients; cell wall material from plant tissue selected from parenchymal plant tissue, stem tissue of monocotyledon plants and combinations thereof; and optionally further ingredients. The invention further relates to a method for the preparation of said savoury concentrate and to a process for preparing a ready-to-eat savoury product using said savoury concentrate.

BACKGROUND OF THE INVENTION

Savoury concentrates are well-known in the art. These concentrates provide a convenient way of preparing, for instance, a soup, a sauce or can be used as a seasoning for a dish. Examples of savoury concentrates include dry concentrates, such as dry soup and bouillon cubes, liquid concentrates such as condensed soups, concentrated sauces and gelled concentrates. Savoury concentrates in the form of pastes are also known. Savoury concentrates are usually combined with hot water and optionally further food ingredients, such as vegetables or a protein source, to prepare a ready-to-eat savoury product (e.g. a bouillon, a soup, a sauce or a gravy).

Savoury concentrates typically have a shelf-life of several months at ambient temperature. Savoury concentrates that comprise high levels of liquid oil, such as vegetable oil, tend to show oil exudation over time. Oil exudation results in the formation of an oily layer within the product package. This renders the product unattractive and may even cause consumers to reject the product.

WO 2017/186558 describes an oil-continuous savoury concentrate comprising:
- 24-85 wt. % of fat by weight of the total concentrate, said fat having a solid fat content at 20° C. ($N_{20}$) of at least 2 wt %;
- 8-50 wt. % of water by weight of the total concentrate;
- 0.1-20 wt % of water structuring agent by weight of the amount of water in the concentrate;
- 0.2-3 mol per 100 g of water of alkalimetal cation selected from $Na^+$, $K^+$ and combinations thereof;
- 0.2-3 mol chloride anion per 100 g of water;

wherein fat and water are present in a weight/weight ratio fat to water of at least 2:3. The savoury concentrate is microbiologically stable for several months, and does not exhibit significant syneresis or oil exudation during storage at ambient temperature.

Oil exudation in savoury concentrates can be minimized by mixing liquid oil with a high melting fat component. Examples of such high melting fat components are hydrogenated vegetable oils (e.g. fully hydrogenated rapeseed oil) or high melting palm oil fractions (palm stearins). However, these high melting fat components, unlike the liquid oil, contain high levels of saturated fatty acids. Fats that contain high levels of saturated fatty acids are generally regarded as less healthy than liquid oils that contain high levels of unsaturated fatty acids.

In addition, if these savoury concentrates with high melting fats are transported in tropical countries in trucks without temperature control, the temperature within the truck may easily rise far above the melting temperature of the high melting fats, which affects the stability of the savoury concentrates, e.g. undesired layers are formed in the savoury concentrate.

Therefore, there is a clear consumer need to obtain a stable savoury concentrate for the preparation of e.g. sauces, which contains a high level of liquid oil, but does not suffer from oil exudation or undesired layer formation.

SUMMARY OF THE INVENTION

The inventors of the present invention have developed a savoury concentrate that meets these consumer needs.

The inventors have discovered a new, very effective way of structuring the oil phase of savoury concentrates and to thereby minimize oil exudation. In particular, it was found that particulate anhydrous non-defibrillated cell wall material from parenchymal pant tissue and/or stem tissue of monocotyledon plants, having a particle size of between 25 µm and 500 µm, is capable of forming an oil-retaining matrix within a liquid oil component. Unlike high melting fat, the oil-structuring properties of the particulate non-defibrillated cell wall material is not affected by temperature increase.

The particulate cell wall material that is employed in accordance with the present invention differs from microfibrillated cellulose in that it does not largely consist of cellulose microfibrils that have been isolated from disrupted and disentangled cellulose containing primary or secondary plant cell material. Instead, the particulate anhydrous non-defibrillated cell wall material that is used in accordance with the present invention is largely composed of particles that contain cell wall fragments in which the cellulose microfibrils are still linked via hemicellulosic tethers into a cellulose-hemicellulose network that is embedded in a matrix of pectin and/or lignin.

Thus, the present invention provides a savoury concentrate comprising:
- a) at least 30 wt. %, by weight of the concentrate, of an oil phase comprising liquid oil;
- b) 3-30 wt. %, by weight of the concentrate, of an edible salt selected from sodium chloride, potassium chloride and combinations thereof;
- c) 1-50 wt. %, by weight of the concentrate, of savoury taste giving ingredients selected from glutamate, 5'-ribonucleotides, sucrose, glucose, fructose, lactic acid, citric acid and combinations thereof;
- d) up to 10 wt. %, by weight of the concentrate, of water; and
- e) particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 µm and 500 µm;
  wherein the particulate anhydrous non-defibrillated cell wall material is dispersed in the oil phase in a concentration of 0.05 to 15 wt. %, by weight of the liquid oil;

and wherein the total structuring capacity (TSC) of the savoury concentrate is in the range of 1-20;

$$TSC = N_{20} + A_{cwm} * C_{cwm}$$

wherein:
$A_{cwm}$ is the oil structuring capacity of the particulate cell wall material, $A_{cwm}$ equaling 4 in case the particulate cell wall material originates from stem tissue of monocotyledon plants, and $A_{cwm}$ equaling 0.6 if the particulate cell wall material originates from parenchymal plant tissue;

$C_{cwm}$ is the concentration (in wt. %) of the particulate cell wall material by weight of the liquid oil.

The particulate cell wall material of the present invention has a very low bulk density, i.e. typically a bulk density of not more than 100 g/l. Although the inventors do not wish to be bound by theory, it is believed that liquid oil is capable of entering the voids between and within the particles of non-defibrillated cell wall material. The presence of the particles of non-defibrillated cell wall material in liquid oil increases the viscosity of the oil phase and at sufficiently high concentrations these particles can even render the oil-phase semi-solid. It is believed that the structuring capability of the particulate cell wall material is due to its capacity to build a space-filling (percolating) network. Thus, surprisingly, the particulate cell wall material, which is hydrophilic in nature, remains suspended within the hydrophobic oil phase.

The particulate cell wall material of the present invention can suitably be used to fully or partially replace hard stock fat in savoury concentrates.

The present invention further pertains to a method for the preparation of a savoury concentrate, said method comprises the combining of the following components:

a. 100 parts by weight of an oil phase comprising liquid oil;
b. 0.05-15 parts by weight of particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 µm and 500 µm and a bulk density of less than 100 grams per litre;
c. 4-45 parts by weight of an edible salt selected from sodium chloride, potassium chloride and combinations thereof;
d. 1-120 parts by weight of savoury taste giving ingredients selected from glutamate, 5'-ribonucleotides, sucrose, glucose, fructose, lactic acid, citric acid and combinations thereof;

wherein the prepared savoury concentrate comprises not more than 10 wt. % water; and wherein the total structuring capacity (TSC) of the savoury concentrate is in the range of 1-20;

$$TSC = N_{20} + A_{cwm} * C_{cwm}$$

wherein:

$A_{cwm}$ is the oil structuring capacity of the particulate cell wall material, $A_{cwm}$ equaling 4 in case the particulate cell wall material originates from stem tissue of monocotyledon plants, and $A_{cwm}$ equaling 0.6 if the particulate cell wall material originates from parenchymal plant tissue;

$C_{cwm}$ is the concentration (in wt. %) of the particulate cell wall material by weight of the liquid oil.

DETAILED DESCRIPTION OF THE INVENTION

A first aspect of the invention relates to a savoury concentrate comprising:

a) at least 30 wt. %, by weight of the concentrate, of an oil phase comprising liquid oil;

b) 3-30 wt. %, by weight of the concentrate, of an edible salt selected from sodium chloride, potassium chloride and combinations thereof;
c) 1-50 wt. %, by weight of the concentrate, of savoury taste giving ingredients selected from glutamate, 5'-ribonucleotides, sucrose, glucose, fructose, lactic acid, citric acid and combinations thereof;
d) up to 10 wt. %, by weight of the concentrate, of water; and
e) particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 µm and 500 µm;

wherein the particulate anhydrous non-defibrillated cell wall material is dispersed in the oil phase in a concentration of 0.05 to 15 wt. %, by weight of the liquid oil; and wherein the total structuring capacity (TSC) of the savoury concentrate is in the range of 1-20;

$$TSC = N_{20} + A_{cwm} * C_{cwm}$$

wherein:

$A_{cwm}$ is the oil structuring capacity of the particulate cell wall material, $A_{cwm}$ equaling 4 in case the particulate cell wall material originates from stem tissue of monocotyledon plants, and $A_{cwm}$ equaling 0.6 if the particulate cell wall material originates from parenchymal plant tissue;

$C_{cwm}$ is the concentration (in wt. %) of the particulate cell wall material by weight of the liquid oil.

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of 20° C.

Unless indicated otherwise, weight percentages (wt. %) are based on the total weight of the concentrate.

The terms 'fat' or 'oil' are used interchangeably, unless specified otherwise. The terms 'fat' and 'oil' as used herein refers to glycerides selected from triglycerides, diglycerides, monoglycerides, phosphoglycerides, free fatty acids and combinations thereof. Where applicable the prefix 'liquid' or 'solid' is added to indicate whether the fat or oil is liquid or solid at 20° C. "Hard stock" is an example of a solid fat. Hard stock typically has a solid fat content at 20° C. ($N_{20}$) of at least 30%.

The term 'oil phase' as used herein refers to a distinct lipid phase within the savoury concentrate that contains oil and optionally other lipids. Non-lipid components that are dispersed in the oil phase (e.g. particulate cell wall material) are not part of the oil phase.

The solid fat content of the oil phase can suitably be determined using the method described in *Animal and vegetable fats and oils—Determination of solid fat content by pulsed NMR—Part 1: Direct method*—ISO 8292-1:2008. The solid fat content of the oil phase at a temperature of x° C. is represented by "$N_x$" and expressed in %.

The concentration of liquid oil in the oil phase of a savoury concentrate equals 100%-$N_{20}$. Thus, a savoury concentrate containing 48 wt. % oil phase having a $N_{20}$ of 5 wt. %, has a liquid oil content of 0.48×95=45.6 wt. %.

Whenever reference is made to a concentration of a component in wt. %, by weight of the liquid oil, what is meant is the concentration that is calculated by dividing the weight of said component by the weight of liquid oil, and by expressing the calculated ratio as a percentage. Thus, for a savoury concentrate containing 50 grams of oil and 2.8 grams of particulate anhydrous non-defibrillated cell wall material, the concentration of particulate anhydrous non-defibrillated cell wall material is 5.6 wt. %, by weight of the liquid oil.

Whenever reference is made herein to 'particulate anhydrous non-defibrillated cell wall material' or to 'particulate cell wall material', unless indicated otherwise, this refers to 'particulate anhydrous non-defibrillated cell wall material from plant tissue selected from parenchymal plant tissue, stem tissue of monocotyledon plants and combinations thereof, having a particle size of between 25 μm and 500 μm'. It should be understood that in as far as the savoury concentrate contains particulate cell wall material having a particle size of less than 25 μm or more than 500 μm, this is not 'particulate cell wall material'.

The term 'non-defibrillated cell wall material from plant tissue' as used herein refers to cell wall material that has been isolated from plant tissue. In as far as the non-defibrillated cell wall material originates from parenchymal tissue, this non-defibrillated cell wall material does not comprise tissue structure (an ensemble of similar cells and their extracellular matrix from the same origin) and is thus distinguishable from pieces of plant matter such as pieces of herbs, spices, vegetables. The non-defibrillated cell wall material does contain cellulose microfibrils that are linked via hemicellulosic tethers into a cellulose-hemicellulose network that is embedded in a pectin and/or lignin matrix.

The water content of the savoury concentrate refers to the total water content, thus including the water that is present within the ingredients of the savoury concentrate.

The particle size distribution of the particulate anhydrous non-defibrillated cell wall material and other particulate materials can suitably be determined by means of sieving, i.e. by employing a set of sieves of different mesh sizes. The sieving may be carried out on the dry particles, but may also be carried out on a relatively dilute dispersion of the particles in a hydrophobic medium, such as for instance a liquid triglyceride oil.

The 'oil exudation' can suitably be quantified by means of the method as explained below in the examples. The amount of free oil determined by this method preferably is not more than 1 wt. %, more preferably not more than 0.5 wt. %, by weight of the total savoury concentrate.

The term 'bulk density' as used herein, unless indicated otherwise, refers to freely settled bulk density. In as far as reference is made herein to the bulk density of components within the savoury concentrate, these components are first isolated from the savoury concentrate using the procedure described in the Examples.

Savoury Concentrate

The savoury concentrate according to invention is preferably in solid form (e.g. a cube or a granulate) or in the form of a paste. More preferably the savoury concentrate is in the form of a paste, i.e. a very thick viscous fluid.

The savoury concentrate preferably comprises, by weight of the concentrate, 33-75 wt. % of the oil phase, more preferably 36-70 wt. % of the oil phase and most preferably 40-65 wt. %, of the oil phase.

Preferably, the oil phase has a solid fat content at 20° C. ($N_{20}$) of 0-15% and a liquid oil content at 20° C. that equals 100%-$N_{20}$. The inventors have observed that the dissolution rate of savoury concentrates can be improved by replacing solid fat with the particulate cell wall material of the present invention. This beneficial effect is especially pronounced if the oil phase of the savoury concentrate has a solid fat content at 20° C. ($N_{20}$) of less than 10%, more preferably a $N_{20}$ of less than 5%, even more preferably a $N_{20}$ of less than 3% and most preferably a $N_{20}$ of 0%.

The oil phase in the savoury concentrate preferably has a solid fat content at 35° C. ($N_{35}$) of less than 5%, more preferably a $N_{35}$ of less than 3% and most preferably a $N_{35}$ of 0%.

Preferably, the oil phase contains at least 30 wt. % of vegetable oil, more preferably at least 50 wt. % of vegetable oil, even more preferably at least 70 wt. % and most preferably the oil phase contains at least 90 wt. % of vegetable oil. Examples of vegetable oils that may be employed include sunflower oil, soybean oil, rapeseed oil, cottonseed oil, maize oil, olive oil, palm oil, palm kernel oil, coconut oil, fractions of these oils and combinations thereof.

The oil phase of the present invention preferably does not comprise hydrogenated fat.

The savoury concentrate preferably comprises, by weight of the concentrate, 5-25 wt. %, more preferably 8-20 wt. %, of the edible salt, selected from sodium chloride, potassium chloride and combinations thereof. Preferably the edible salt is sodium chloride.

The savoury concentrate preferably comprises, by weight of the concentrate, 5-40 wt. %, preferably 10-30 wt. %, of the savoury taste giving ingredients, selected from glutamate, 5'-ribonucleotides, sucrose, glucose, fructose, lactic acid, citric acid and combinations thereof.

These savoury taste giving ingredients may be added as such or they may be added as intrinsic components of an ingredient such as a yeast extract, meat extract, plant extract or a fish extract.

The savoury concentrate preferably comprises, by weight of the concentrate, up to 9 wt. % of water, more preferably up to 8 wt. % of water.

Preferably, the oil phase is a structured oil phase due to the presence of the particulate anhydrous non-defibrillated cell wall material.

The inventors have found that the particulate anhydrous non-defibrillated cell wall material can take over the structuring function of high melting fat that is typically applied in savoury concentrates to prevent oil exudation. The high melting fat and the particulate anhydrous non-defibrillated cell wall material can be used in combination to structure the liquid oil component of the savoury concentrate.

Preferably, the components a) to e) of the savoury concentrate together constitute at least 60 wt. % of the savoury concentrate. More preferably, the components a) to e) of the savoury concentrate together constitute at least 65 wt. % of the savoury concentrate. Most preferably, the components a) to e) of the savoury concentrate together constitute at least 70 wt. % of the savoury concentrate.

The savoury concentrate preferably has a water activity ($A_w$) within the range of 0.15-0.6, more preferably within the range of 0.2-0.55 and most preferably within the range of 0.25-0.50.

The savoury concentrate preferably comprises, by weight of the concentrate, not more than 25 wt. % of sugars selected from sucrose, glucose, fructose and combinations thereof.

More preferably, the savoury concentrate comprises, by weight of the concentrate, not more than 20 wt. % of said sugars.

The savoury concentrate preferably comprises, by weight of the concentrate, 0.1-50 wt. % of pieces of plant material selected from herbs, spices, vegetables and combinations thereof, said pieces of plant material having a diameter in the range of 100 to 3,000 μm. These pieces of plant material contain tissue structures. More preferably, the savoury concentrate comprises, by weight of the concentrate 1-40 wt. % of said pieces plant material and most preferably 5-35 wt. % of said pieces of plant material.

Particulate Anhydrous Non-Defibrillated Cell Wall Material

The particulate anhydrous non-defibrillated cell wall material of the present invention contains not more than 15 wt. % water. Preferably the water content of said particulate cell wall material is less than 12 wt. %, more preferably less than 9 wt. % and most preferably less than 7 wt. %.

The particulate cell wall material that is employed in accordance with the present invention is preferably particulate parenchymal cell wall material or cell wall material originating from the stems of monocotyledon plants. Most preferably, the particulate cell wall material is particulate parenchymal cell wall material.

It is an important element of the present invention that the liquid oil in the oil phase is sufficiently structured to avoid oil exudation under normal storage, use and transportation conditions. Structuring of the liquid oil within the oil phase is provided by the particulate cell wall material and optionally by high melting fat. The solid fat content at 20° C. of the liquid oil phase provides a measure of the amount of high melting fat that is present in the oil phase.

In order to achieve adequate oil structuring, a liquid oil typically requires addition of high melting fat in a sufficient amount to achieve a solid fat content at 20° C. ($N_{20}$) of at least 7%. The present invention makes it possible, however, to achieve comparable structuring, using less or even no high melting fat.

The total structuring capacity (TSC) of the savoury concentrate is preferably in the range of 2-15 and most preferably in the range of 3-12.

Particulate parenchymal Cell Wall Material

The structuring capacity of the particulate parenchymal cell wall material is substantially higher than the structuring capacity of high melting fat. In other words, less particulate parenchymal cell material is required to achieve the same oil structuring effect as a given quantity of high melting fat.

As explained herein before, the non-defibrillated parenchymal cell wall material that is employed in accordance with the present invention does not comprise intact tissue and is thus distinguishable from pieces of plant matter.

The particulate parenchymal cell wall material of the present invention may comprise both primary cell wall material and secondary cell wall material. Preferably, at least 85 wt. %, more preferably at least 90 wt. % and most preferably at least 95 wt. % of said particulate cell wall material is primary cell wall material.

Primary plant cell walls contain not more than a minor amount of lignin, if at all. The particulate anhydrous cell wall material preferably contains less than 10 wt. %, more preferably less than 3 wt. % and most preferably less than 1 wt. % lignin.

The particulate parenchymal cell wall material employed in accordance with the present invention preferably originates from fruit, bulb, root, tuber, leaf, and/or stem tissue. More preferably, the particulate anhydrous non-defibrillated cell wall material originates from one or more plant sources selected from carrot, cucumber, sugar beet, apple, pear, leek, celery, pumpkin, kiwi, strawberry, papaya, pine apple, prune, melon, apricot, grapes, onion, tomato, potato, cabbage and coconut. Even more preferably, said particulate cell wall material originates from one or more plant sources selected from carrot, onion, pumpkin, cucumber and tomato. Most preferably, the particulate cell wall material originates from carrot and/or cucumber.

Preferably, the particulate parenchymal cell wall material is dispersed in the oil phase in a concentration of 0.05-4 wt. %, more preferably 0.1-2.5 wt. %, most preferably 0.2-1.5 wt. %, by weight of the liquid oil.

In a particularly preferred embodiment, the savoury concentrate comprises:

a) 40-65 wt. %, by weight of the concentrate, of the oil phase having a solid fat content at 20° C. ($N_{20}$) of 0-5% and a liquid oil content at 20° C. that equals 100%-$N_{20}$;

b) 8-20 wt. %, by weight of the concentrate, of an edible salt selected from sodium chloride, potassium chloride and combinations thereof;

c) 10-30 wt. %, by weight of the concentrate, of savoury taste giving ingredients selected from glutamate, 5'-ribonucleotides, sucrose, glucose, fructose, lactic acid, citric acid and combinations thereof;

d) up to 8 wt. %, by weight of the concentrate, of water;

e) 5-35 wt. % of pieces of plant material selected from herbs, spices, vegetables and combinations thereof, said pieces of plant material having a diameter in the range of 100 to 3,000 μm; and f) the particulate anhydrous non-defibrillated parenchymal cell wall material; wherein the particulate anhydrous non-defibrillated parenchymal cell wall material is dispersed in the oil phase in a concentration of 0.2-1.5 wt. %, by weight of the liquid oil.

Particulate Cell Wall Material Originating from the Stems of Monocotyledon Plants The structuring capacity of the particulate cell wall material originating from the stems of monocotyledon plants is slightly lower than the structuring capacity of high melting fat. In other words, slightly more of this particulate cell material is required to achieve the same oil structuring effect as a given quantity of high melting fat.

The particulate cell wall material from the stems of monocotyledon plants employed in accordance with the present invention preferably originates from the stems of wheat, oat, rye, spelt or a combination thereof. More preferably said particulate cell wall material originates from the stems of wheat and/or oat, most preferably from the stems of wheat.

The particulate cell wall material from monocotyledon plants typically contains 40-60 wt. % cellulose, 20-40 wt. % hemicellulose, 10-30 wt. % lignin.

Preferably, the particulate cell wall material from monocotyledon plants is dispersed in the oil phase in a concentration of 0.5-15 wt. %, more preferably 1-13 wt. %, most preferably 2-10%, by weight of the liquid oil.

In accordance with a particularly preferred embodiment, the oil phase has a solid fat content at 20° C. ($N_{20}$) of 1-15%, more preferably 2-10%, and the particulate cell wall material from monocotyledon plants is dispersed in the oil phase in a concentration of 0.5-13 wt. %, more preferably 1-10 wt. % by weight of the liquid oil.

In a particularly preferred embodiment, the savoury concentrate comprises:
 a) 40-65 wt. %, by weight of the concentrate, of the oil phase having a solid fat content at 20° C. ($N_{20}$) of 0-5% and a liquid oil content at 20° C. that equals 100%-$N_{20}$;
 b) 8-20 wt. %, by weight of the concentrate, of an edible salt selected from sodium chloride, potassium chloride and combinations thereof;
 c) 10-30 wt. %, by weight of the concentrate, of savoury taste giving ingredients selected from glutamate, 5'-ribonucleotides, sucrose, glucose, fructose, lactic acid, citric acid and combinations thereof;
 d) up to 8 wt. %, by weight of the concentrate, of water;
 e) 5-35 wt. % of pieces of plant material selected from herbs, spices, vegetables and combinations thereof, said pieces of plant material having a diameter in the range of 100 to 3,000 µm; and
 f) the particulate anhydrous non-defibrillated cell wall material originating from monocotyledon plants;
wherein the particulate anhydrous non-defibrillated cell wall material originating from monocotyledon plants is dispersed in the oil phase in a concentration of 0.5 to 15 wt. %, by weight of the liquid oil.

Method

A second aspect of the invention relates to a method for the preparation of a savoury concentrate, said method comprises the combining of the following components:
 a. 100 parts by weight of an oil phase comprising liquid oil;
 b. 0.05-15 parts by weight of particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 µm and 500 µm and a bulk density of less than 100 grams per litre;
 c. 4-45 parts by weight of an edible salt selected from sodium chloride, potassium chloride and combinations thereof;
 d. 1-120 parts by weight of savoury taste giving ingredients selected from glutamate, 5'-ribonucleotides, sucrose, glucose, fructose, lactic acid, citric acid and combinations thereof;
wherein the prepared savoury concentrate comprises not more than 10 wt. % water; and wherein the total structuring capacity (TSC) of the savoury concentrate is in the range of 1-20;

$$TSC = N_{20} + A_{cwm} * C_{cwm}$$

wherein:
 $A_{cwm}$ is the oil structuring capacity of the particulate cell wall material, $A_{cwm}$ equaling 4 in case the particulate cell wall material originates from stem tissue of monocotyledon plants, and $A_{cwm}$ equaling 0.6 if the particulate cell wall material originates from parenchymal plant tissue;
 $C_{cwm}$ is the concentration (in wt. %) of the particulate cell wall material by weight of the liquid oil.

According to a particularly preferred embodiment, the aforementioned method is used to prepare a savoury concentrate as defined herein before.

The embodiments that have been described herein before in the context of the savoury concentrate of the invention equally apply to this method for the preparation of a savoury concentrate.

In one embodiment of the invention, 0.05-4 parts by weight of the particulate parenchymal cell wall material are combined with 100 parts by weight of oil phase.

More preferably, 0.1-2.5 parts by weight of this particulate cell wall material are combined with 100 parts by weight of oil phase. Most preferably, 0.2-1.5 parts by weight of this particulate cell wall material are combined with 100 parts by weight of oil phase.

The bulk density of the particulate parenchymal cell wall material preferably is less than 35 g/l, more preferably less than 20 g/l, even more preferably in the range of 1-15 g/l, most preferably in the range of 2-10 g/l.

The particulate parenchymal cell wall material that is employed in the present method preferably has a self-suspending capacity at a concentration of 0.3 wt. % and after 5 minutes of at least 60%, more preferably of 70-100%, most preferably of 80-100%. The self-suspending capacity of the particulate cell wall material may be determined using the method described in the Examples.

The particulate parenchymal cell wall material is preferably obtained by a process comprising:
 providing plant material having a water content of at least 50 wt. % and comprising parenchymal tissue from plant material, said parenchymal tissue providing at least 80 wt. % of the dry matter in the starting material;
 heating the plant material to a temperature 'T' in the range of 70-160° C. during a time period wherein temperature T (in ° C.) and the time period t (in minutes) meet the following equation:

$$t > \frac{1200}{(T-69)^{1.4}}$$

washing the heated plant material or a fraction of the heated plant material with water to reduce the concentration of monosaccharides to less than 10% by weight of dry matter, said monosaccharides being selected from glucose, fructose and combinations thereof; and
 drying the washed plant material;
wherein the plant material is comminuted before the washing step to produce a pulp.

The plant material that is used in the preparation of the particulate parenchymal cell wall material is preferably selected from carrot, cucumber, sugar beet, apple, pear, pumpkin, kiwi, strawberry, leek, papaya, pine apple, prune, melon, apricot, grapes onion, tomato, potato, cabbage, coconut and combinations thereof.

In an alternative embodiment of the invention, 0.5-18 parts by weight of the particulate cell wall material from monocotyledon plants are combined with 100 parts by weight of oil phase. More preferably, 1-13 parts by weight of this particulate cell wall material are combined with 100 parts by weight of oil phase. Most preferably, 2-10 parts by weight of this particulate cell wall material are combined with 100 parts by weight of oil phase.

The particulate cell wall material from monocotyledon plants preferably has a bulk density of 10-100 g/l, more preferably a bulk density of 20-50 g/l, most preferably of 30-45 g/l.

The particulate cell wall material from monocotyledon plants that is employed in the present method preferably has a self-suspending capacity at a concentration of 2 wt. % and after 5 minutes of at least 50%, more preferably of 60-100%, most preferably of 70-100%.

The particulate cell wall material from monocotyledon plants is preferably obtained by a process comprising:
  providing stems of monocotyledon plants;
  milling the stems; and
  sieving the milled stems.

The plant material that is used in the preparation of the particulate cell wall material is preferably selected from stems of wheat, stems of oat, stems of rye, stems of spelt and combinations thereof.

Preferably, 100 parts by weight of the oil phase are combined with 6-40 parts by weight of the edible salt. More preferably, 100 parts by weight of the oil phase are combined with 10-35 parts by weight of the edible salt.

Preferably, 100 parts by weight of the oil phase are combined with 6-100 parts by weight of the savoury taste giving ingredients. More preferably, 100 parts by weight of the oil phase are combined with 12-90 parts by weight of the savoury taste giving ingredients.

The particulate cell wall material employed in the present method typically contains not more than a limited amount of water soluble salt. Accordingly, when dispersed in demineralised water in a concentration of 3 wt. % the particulate cell wall material produces a suspension having a conductivity of less than 200 µS/cm, preferably of less than 100 µS/cm.

The savoury concentrate that is obtained by the present method preferably comprises 33-75 wt. %, by weight of the concentrate, of the oil phase. More preferably, the prepared savoury concentrate comprises 36-70 wt. %, by weight of the concentrate, of the oil phase. Most preferably, the prepared savoury concentrate comprises 40-65 wt. %, by weight of the concentrate, of the oil phase.

Preferably, the oil phase has a solid fat content at 20° C. ($N_{20}$) of 0-15% and a liquid oil content at 20° C. that equals 100%-$N_{20}$. More preferably, the oil phase has a $N_{20}$ of 0-10%, even more preferably of 0-5% and yet more preferably of 0-3%. Most preferably, the oil phase has a $N_{20}$ of 0%.

In a preferred embodiment, the oil phase is prepared by blending two or more different oils or oil fractions to obtain the oil phase. For example, a melted high melting fat component can be mixed with a liquid oil to obtain an oil phase.

The prepared savoury concentrate preferably comprises up to 9 wt. %, by weight of the concentrate, of water. More preferably, the prepared savoury concentrate comprises up to 8 wt. %, by weight of the concentrate, of water.

In a preferred embodiment 100 parts by weight of the oil phase are combined with 0.1-120 parts by weight of pieces of plant material selected from herbs, spices, vegetables and combinations thereof, said pieces of plant material having a diameter in the range of 100 to 3,000 µm. More preferably, 100 parts by weight of the oil phase are combined with 1-100 parts by weight of said pieces of plant material. Most preferably, 100 parts by weight of the oil phase are combined with 6-80 parts by weight of said pieces of plant material.

In a preferred embodiment, the method comprises the steps of:
  dispersing the particulate cell wall material into the oil phase to obtain a dispersion; and
  combining said dispersion with one or more other components of the savoury concentrate, more preferably combining said dispersion with the edible salt.

In an alternative embodiment, the method comprises the steps of:
  mixing the particulate cell wall material with the edible salt and the savoury taste giving ingredients; and
  dispersing the resulting mixture into the oil phase.

Preferably, the method of the invention produces the savoury concentrate according to the invention as described herein before.

The savoury concentrate that is produced by the present method is preferably filled into a container (e.g. a jar), a pouch or a sachet.

Process of Preparing a Ready-To-Eat Savoury Product

A third aspect of the invention relates to a process of preparing a ready-to-eat savoury product, said process comprising the steps of mixing 1 part by weight of the savoury concentrate according to the present invention with 1-50 parts by weight of other edible components.

Preferably, 1 part by weight of the savoury concentrate is mixed with 1-40 parts by weight of aqueous liquid. More preferably, the present process comprises mixing 1 part by weight of the savoury concentrate with 4-20 parts by weight of aqueous liquid.

Examples of ready-to-eat savoury products that can be prepared in this manner include bouillons, soups, sauces, gravies, pan dishes or oven dishes.

According to one embodiment, the savoury concentrate is mixed with hot aqueous liquid having a temperature of at least 50° C., preferably of at least 70° C.

In accordance with another embodiment, the savoury concentrate is mixed with cold water having a temperature of less than 30° C. and the resulting mixture is subsequently heated to a temperature in excess of 70° C.

The aqueous liquid that is mixed with the savoury concentrate typically contains at least 70 wt. %, more preferably at least 80 wt. % of water.

Use as a structuring agent, a thermal stabilizer and/or a dissolution enhancer Yet another aspect of the invention relates to the use of particulate anhydrous non-defibrillated cell wall material from plant tissue selected from parenchymal plant tissue, stem tissue of monocotyledon plants and combinations thereof, having a particle size of between 25 µm and 500 µm and a bulk density of less than 100 grams per litre as an oil structuring agent, a thermal stabilizer and/or a dissolution enhancer in a savoury concentrate comprising at least at least 30 wt. %, by weight of the concentrate, of an oil phase comprising liquid oil, said use comprising dispersing the particulate anhydrous non-defibrillated cell wall material in the oil phase.

Preferably, the particulate cell wall material is used in a savoury concentrate as defined herein before.

The invention is further illustrated by means of the following examples.

EXAMPLES

Characterization Methods
Bulk Density:
The bulk density of particulate cell wall material is measured by placing a metered glass cylinder (Hirshmann, techcolor, Germany 250 ml, inner diameter 3.5 cm, catalogue #2260186) on a balance with a plastic funnel on top (converging from 15 cm to 3 cm outer diameter). The cylinder is filled, the powder weight and the free settled powder volume are recorded, and the bulk density is calculated in g/L.

The bulk density of particulate cell wall material that is present in a savoury concentrate is determined by first isolating the particulate cell wall material by means of the following procedure:
- homogenise the product by careful stirring
- take 50 g sample and mix with 500 ml isopropyl alcohol (IPA)
- filter on a 0.5 mm pore size sieve (from EndeCotts RVS) and a 0.025 mm poresize Miraclothfilter (from Cal-Biochem).
- collect the residue on the Miracloth filter (collected fraction has a particle size distribution between 0.025 mm and 0.5 mm)
- wash the collected fraction 4 times with 200 ml IPA on a Miracloth filter
- leave the residue to dry in a fuming cabinet for 1 hour
- wash the residue 4 times with 500 ml hot, boiled demineralised water on a Miracloth filter
- freeze dry the washed residue (for 3 days, using Freeze dryer from Labconco, at ~0.1 mbar)

The bulk density of the freeze dried residue is determined as described above, except that a 50 ml cylinder (with an internal diameter of 2.1 cm) is used.

Self-Suspending Capacity:

The self-suspending capacity (SSC) is measured by combining a given quantity of particulate cell wall material with demineralized water to produce a 100 ml suspension in a 100 ml measuring cylinder, and by mixing for 16 hours (at room temperature), using a small magnetic stirrer. After the stirrer has been removed, the top of the cylinder is closed using a plastic seal and the contents are gently mixed by turning the cylinder upside down three times.

Then the sample is placed on a table and after exactly 5 minutes and 60 minutes the % SSC is measured (this is the volume occupied by the suspended particles).

The SSC of particulate cell wall material that is present in a savoury concentrate is determined by first isolating the particulate cell wall material using the procedure described above in relation to bulk density measurement.

Evaluation Methods

Oil Exudation Assessment

The savoury concentrates were assessed for exudation of oil after 7 days of storage at ambient temperature. The lid of the savoury concentrate was removed and the savoury concentrate was subsequently turned at an angle between 135 and 180 degrees, where 180 degrees means completely upside down, for a time period of 1 minute. The oil that ran freely from the savoury concentrate was filtered using a tea sieve, and collected on a weighing plate. The amount of free oil was determined as weight percentage of the weight of the total savoury concentrate, i.e. the weight of the savoury concentrate before the weight of the free oil had been determined.

High Temperature Stability Test

To simulate tropical transit temperature conditions, the samples were placed overnight in an oven at 60° C. The next day, after letting the samples cool down to ambient temperature, the samples were inspected visually for undesired layer formation. In case a layer of free oil was formed, the weight percentage of this layer was determined according to the method described above.

Dissolution Test 35 g sample of savoury concentrate is added to 0.5 L demineralised water at room temperature (20-22° C.) in a 1 L glass beaker (height 14.5 cm, internal diameter 10 cm) under stirring with a magnetic stirrer bar (triangular length 8 cm, internal diameter 1.5 cm) at 250 rpm. Maximal heating is set 300° C. (IKA RCT classic heater and magnetic stirrer) and is started at t=0 min. Both conductivity and temperature are recorded (WTWnolab Multi 930 and conductivity probe IDS TetraCon 925) for 10-15 minutes (when conductivity has become constant).

The dissolution time is defined as the time needed to reach 90% of the final conductivity at the end of the experiment. All samples are measured in duplicate.

Example 1

Particulate anhydrous non-defibrillated cell wall material from carrot was prepared as follows:
- 154 g finely cut press cake residue from carrot juice production (26% DM, stored frozen) was dispersed in just boiled demineralized water (total weight 1.5 kg, 2.7% DM).
- The dispersion was heated in a microwave oven and pureed in a Thermomix.
- The puree was washed with 4 L demineralized water using filter cloth and the residue was redispersed in demineralized water (1.5 kg total mass).
- The dispersion was sheared using a Silverson mixer, heated in a Thermomix (30 min at 90° C.), washed with 2 L demineralized water and sheared again (Silverson mixer with fine emulsor screen, 10 minutes at 7000 rpm).
- The dispersion was washed on Miracloth filter with 1 L demineralized water.
- The residue was collected and redispersed in demineralized water (1.5 kg total mass).
- The dispersion was homogenized at 500 bar using a high pressure homogenizer.
- The homogenized dispersion was washed on Miracloth filter using 1 L demineralized water.
- The residue was collected and redispersed in demineralized water (1 L total weight).
- The suspension was added dropwise to liquid nitrogen, quickly frozen and freeze dried.

The bulk density of freeze dried powder was determined to be 7 g/L. The % SSC of 0.3% (w/v) freeze dried powder was determined to be 95% after 5 min and 85% after 60 min.

Example 2

Particulate anhydrous non-defibrillated cell wall material from pumpkin was prepared as follows:

A butter pumpkin was peeled, the core was removed and the flesh was cut in cubes (≤3 cm). To 0.7 kg pumpkin cubes 0.6 L just boiled demineralized water was added and then boiled using the microwave at 1000 W for 3 min. Subsequently the batch was processed in the Thermomix (30 min, 95° C., speed 3-4), washed with ≈5 L demineralized water using the Miracloth filter, resuspended in 2 L volume with demineralized water, treated by Silverson (using square hole screen for 5 min at 5000 rpm, and then fine emulsor screen for 10 min at 7000 rpm), washed again with L demineralised water using Miracloth filter, treated by high pressure homogenizer at 500-800 bar, washed with ≈1 L demineralised water using Miracloth. The residue was collected and then added dropwise to liquid nitrogen, quickly frozen and freeze dried.

The bulk density of freeze dried powder was determined to be 7 g/L. The % SSC of 0.3% (w/v) freeze dried residue was determined to be 98% after 5 min and 63% after 60 min.

Example 3

Savoury concentrates were prepared on the basis of the recipes shown in Table 1, using the particulate cell wall materials of Examples 1 and 2.

TABLE 1

|  | Wt. % | | | | |
| --- | --- | --- | --- | --- | --- |
|  | A | B | 1 | 2 | 3 |
| Sunflower oil | 45.7 | 44.0 | 45.2 | 43.5 | 43.5 |
| Palm oil stearin (IV = 14) | 0.5 | 2.2 | 0.5 | 2.2 | 2.2 |
| Particulate cell wall material (carrot) |  |  | 0.5 | 0.5 |  |
| Particulate cell wall material (pumpkin) |  |  |  |  | 0.5 |
| NaCl | 4.3 | 4.3 | 4.3 | 4.3 | 4.3 |
| KCl | 5.7 | 5.7 | 5.7 | 5.7 | 5.7 |
| Sugar | 15.7 | 15.7 | 15.7 | 15.7 | 15.7 |
| Powder mix [1] | 24.8 | 24.8 | 24.8 | 24.8 | 24.8 |
| Red bell pepper pieces | 2.8 | 2.8 | 2.8 | 2.8 | 2.8 |
| Basil | 0.2 | 0.2 | 0.2 | 0.2 | 0.2 |
| Parsley | 0.2 | 0.2 | 0.2 | 0.2 | 0.2 |

[1] Dry mix of spices and yeast extract.

The savoury concentrates were prepared using the following procedure:

Oil Phase Preparation

In case the oil phase comprises palm oil stearin, the oil phase was prepared as follows:

A container was filled with oil at a temperature of 5° C.

A Silverson mixing head (type L4RT; fitted with 1 mm hole emulsion screen mixing head) was placed in the oil. The Silverson mixer was started operating at 3000 rpm.

Palm oil stearin was heated to over 80° C. When the heated palm oil stearin was cooled down to 65° C., it was slowly poured into the oil, close to the mixing head to optimize the mixing of the palm oil stearin with the oil. Subsequently, the mixer speed was gradually increased to 7000 rpm.

After complete addition of the molten palm oil stearin, the mixture was sheared for an additional 2 minutes at a speed of 7000 rpm.

The resulting oil phase was stored overnight a 5° C. and used the next day.

Savoury Concentrate Preparation

The savoury concentrates were prepared as follows:

If applicable, the right amount of particulate cell wall material was mixed with the oil phase manually, using a spoon.

All the dry ingredients were weighed and then mixed together for about 1 minute at speed 1, until homogeneous, in a Kenwood (type Chef classic or Chef premiere) kitchen machine, using the K-beater mixing tool.

The oil phase, including the particulate cell wall material if applicable, was added to the dry ingredients mixture and mixed for 2 minutes applying the K-beater mixing tool at speed 2 until homogeneous.

About 80 grams of the final savoury concentrate was filled and capped in plastic (PP) jars with the following dimensions:
bottom diameter: 4.9 cm
top diameter: 5.2 cm
height of the container: 6.3 cm The savoury concentrates were stored at ambient temperature.

The savoury concentrates so obtained were subjected to the high temperature stability test and the dissolution test described above. The results are shown in Table 2.

TABLE 2

|  | A | B | 1 | 2 | 3 |
| --- | --- | --- | --- | --- | --- |
| High temperature stable | No | No | Yes | Yes | Yes |
| Dissolution time (in sec.) | 120 | 203 | 200 | 362 | 342 |

Example 4

Particulate anhydrous non-defibrillated cell wall material from onion was prepared as follows:

To 1 kg fresh cut onion just boiled demineralized water was added to have a 1.7 kg suspension. The suspension was heated (H) in the microwave till boiling temperature was reached (7 min, 1000 W) and blended in a Thermomix for 30 min at 100° C. (blending speed 4 for 25 min then blended at speed 5 for 5 min). The batch was washed using demineralized water (≈6L) and a Buchner funnel and Miracloth filter (pore size 25 μm). The puree was treated by Silverson for 5 min 5000 rpm using square screen workhead and then 10 min 7000 rpm using emulsor screen workhead. The batch was washed (3 L) again using Miracloth 500 g of the puree was treated further by high pressure homogenizer at 500-800 bar (GEA Niro Soavi, Panda Plus), then washed (1 L) using Miracloth, and frozen in liquid nitrogen and then freeze dried.

The bulk density of freeze dried powder was determined to be 7 g/L. The % SSC of 0.3% (w/v) freeze dried residue was determined to be 96% after 5 min and 65% after 60 min.

Example 5

Savoury concentrates were prepared in the same way as described in Example 3 on the basis of the recipes shown in Table 3, using the particulate cell wall material of onion that is described in Example 4.

TABLE 3

|  | Wt. % |
| --- | --- |
|  | 1 |
| Sunflower oil | 43.4 |
| Palm oil stearin (IV = 14) | 2.2 |
| Particulate cell wall material (onion) | 0.6 |
| NaCl | 4.3 |
| KCl | 5.7 |
| Sugar | 15.7 |
| Powder mix [1] | 24.8 |
| Red bell pepper pieces | 2.8 |
| Basil | 0.2 |
| Parsley | 0.2 |

[1] Dry mix of spices and yeast extract.

The savoury concentrate so obtained was subjected to the high temperature stability test and the dissolution test described above. The savoury concentrate was found to be stable and had a dissolution time of 362 seconds.

Example 6

Savoury concentrates were prepared in the same way as described in Example 3 on the basis of the recipes shown in Table 4.

TABLE 4

|  | Wt. % | | |
| --- | --- | --- | --- |
|  | A | 1 | 2 |
| Sunflower oil | 34.7 | 42.0 | 43.0 |
| Palm oil stearin (IV = 14) | 11.5 | 2.0 | 0.5 |
| Particulate cell wall material (wheat) [1] |  | 2.2 | 2.7 |
| NaCl | 4.3 | 4.3 | 4.3 |
| KCl | 5.7 | 5.7 | 5.7 |
| Sugar | 15.7 | 15.7 | 15.7 |
| Powder mix [1] | 24.8 | 24.8 | 24.8 |
| Red bell pepper pieces | 2.8 | 2.8 | 2.8 |
| Basil | 0.2 | 0.2 | 0.2 |
| Parsley | 0.2 | 0.2 | 0.2 |

[1] wheat fiber WF1000 from JELU-WERK (bulk density 50 g/l, 80 wt. % ≥ 32 μm; 30 wt. % ≥ 200 μm).
[2] Dry mix of spices and yeast extract.

The savoury concentrate so obtained was subjected to the high temperature (60° C.) stability test and the dissolution test described above. The results of these tests are shown in Table 5.

TABLE 5

|  | A | 1 | 2 |
| --- | --- | --- | --- |
| High temperature stable | No | Yes | Yes |
| Dissolution time (in sec.) | 521 | 444 | 99 |

Example 7

IPA-insoluble and water-insoluble material was isolated from 50 grams of the savoury concentrates A, B and 2 of Example 3 and 50 grams of the savoury concentrate from Example 5, using the procedure described herein before (see Characterization Methods).

Both the bulk density, and the self-suspending capacity of the isolated insoluble material after 5 and 60 minutes, were determined. The results are shown in Table 6.

TABLE 6

|  | Ex. 3-A | Ex. 3-B | Ex. 3-2 | Ex. 5 |
| --- | --- | --- | --- | --- |
| Bulk density (g/l) | 72 | 74 | 30 | 29 |
| SSC (after 5 min.) | 14 | 15 | 85 | 85 |
| SSC (after 60 min.) | 12 | 13 | 51 | 50 |

Example 8

Savoury concentrates were prepared on the basis of the recipes shown in Table 7.

TABLE 7

|  | Wt. % | | | | |
| --- | --- | --- | --- | --- | --- |
|  | A | B | C | D | 1 |
| Sunflower oil | 40.2 | 40.2 | 40.2 | 40.2 | 43.0 |
| Particulate cell wall material (wheat) [1] | 0.0 | 0.0 | 0.0 | 0.0 | 3.2 |
| NaCl | 4.3 | 4.3 | 4.3 | 4.3 | 4.3 |
| KCl | 5.7 | 5.7 | 5.7 | 5.7 | 5.7 |
| Sugar | 15.7 | 15.7 | 15.7 | 15.7 | 15.7 |
| Powder mix [2] | 24.8 | 24.8 | 30.8 | 24.8 | 24.8 |
| Red bell pepper pieces | 2.9 | 8.9 | 2.9 | 2.9 | 2.9 |

TABLE 7-continued

|  | Wt. % | | | | |
| --- | --- | --- | --- | --- | --- |
|  | A | B | C | D | 1 |
| Potato starch | 6.0 | 0.0 | 0.0 | 0.0 | 0.0 |
| Basil | 0.2 | 0.2 | 0.2 | 0.2 | 0.2 |
| Parsley | 0.2 | 0.2 | 0.2 | 0.2 | 0.2 |

[1] wheat fiber WF1000 from JELU-WERK (bulk density 50 g/l, 80 wt. % ≥ 32 μm; 30 wt. % ≥ 200 μm).
[2] Dry mix of spices and yeast extract.

After 7 days of storage at ambient temperature oil exudation was measured. The results are shown in Table 8.

TABLE 8

|  | A | B | C | D | 1 |
| --- | --- | --- | --- | --- | --- |
| Oil exudation (wt. %) | 16 | 13 | 12 | 16 | 0 |

Example 9

Savoury concentrates were prepared on the basis of the recipes shown in Table 9.

TABLE 9

|  | Wt. % | | | | |
| --- | --- | --- | --- | --- | --- |
|  | A | 1 | 2 | 3 | 4 |
| Sunflower oil | 34.7 | 0.0 | 0.0 | 0.0 | 34.3 |
| Rapeseed oil | 0.0 | 52.0 | 0.0 | 35.0 | 0.0 |
| Soybean oil | 0.0 | 0.0 | 65.0 | 0.0 | 0.0 |
| Palm oil stearin (IV = 14) | 11.6 | 0.0 | 0.0 | 0.0 | 0.0 |
| Particulate cell wall material (wheat) [1] | 0.0 | 5.8 | 10.6 | 3.3 | 8.0 |
| NaCl | 4.3 | 1.5 | 7.0 | 10.0 | 6.3 |
| KCl | 5.7 | 2.5 | 8.0 | 15.0 | 7.7 |
| Sugar | 15.7 | 15.7 | 2.5 | 15.7 | 15.7 |
| Powder mix [2] | 24.8 | 19.3 | 3.7 | 9.0 | 24.8 |
| Red bell pepper pieces | 2.8 | 2.8 | 2.8 | 10.0 | 2.8 |
| Basil | 0.2 | 0.2 | 0.2 | 1.0 | 0.2 |
| Parsley | 0.2 | 0.2 | 0.2 | 1.0 | 0.2 |

[1] wheat fiber WF1000 from JELU-WERK (bulk density 50 g/l, 80 wt. % ≥ 32 μm; 30 wt. % ≥ 200 μm).
[2] Dry mix of spices and yeast extract.

Oil exudation was measured after 7 days of storage at ambient temperature and after heating to 60° C. (high temperature stability). The results are shown in Table 10.

TABLE 10

|  | A | 1 | 2 | 3 | 4 |
| --- | --- | --- | --- | --- | --- |
| Oil exudation (wt. %) | No | No | No | No | No |
| High temperature stability | No | Yes | Yes | Yes | Yes |

Example 10

Savoury concentrates were prepared on the basis of the recipes shown in Table 11.

TABLE 11

|  | Wt. % | | | | |
| --- | --- | --- | --- | --- | --- |
|  | 1 | 2 | 3 | 4 | 5 |
| Sunflower oil | 40.1 | 38.2 | 40.7 | 43.6 | 44.2 |
| Palm oil stearin (IV = 14) | 4.0 | 6.0 | 5.0 | 2.1 | 1.0 |
| Particulate cell wall material (wheat) [1] | 2.1 | 2.0 | 0.5 | 0.5 | 1.0 |
| NaCl | 4.3 | 4.3 | 4.3 | 4.3 | 4.3 |
| KCl | 5.7 | 5.7 | 5.7 | 5.7 | 5.7 |
| Sugar | 15.8 | 15.8 | 15.8 | 15.8 | 15.8 |
| Powder mix [2] | 24.8 | 24.8 | 24.8 | 24.8 | 24.8 |
| Red bell pepper pieces | 2.8 | 2.8 | 2.8 | 2.8 | 2.8 |
| Basil | 0.2 | 0.2 | 0.2 | 0.2 | 0.2 |
| Parsley | 0.2 | 0.2 | 0.2 | 0.2 | 0.2 |

[1] wheat fiber WF1000 from JELU-WERK (bulk density 50 g/l, 80 wt. % ≥ 32 μm; 30 wt. % ≥ 200 μm).
[2] Dry mix of spices and yeast extract.

Oil exudation was measured after 7 days of storage at ambient temperature and after heating to 60° C. (high temperature stability). None of the products were found to suffer from oil exudation and all product showed high temperature stability.

The invention claimed is:

1. A savoury concentrate comprising:
  a) at least 30 wt. %, by weight of the concentrate, of an oil phase comprising liquid oil;
  b) 3-30 wt. %, by weight of the concentrate, of an edible salt selected from sodium chloride, potassium chloride and combinations thereof;
  c) 1-50 wt. %, by weight of the concentrate, of savoury taste giving ingredients selected from glutamate, 5'-ribonucleotides, sucrose, glucose, fructose, lactic acid, citric acid and combinations thereof;
  d) 0-10 wt. %, by weight of the concentrate, of water; and
  e) particulate anhydrous non-defibrillated cell wall material from plant tissue selected from parenchymal plant tissue, stem tissue of monocotyledon plants and combinations thereof, said particulate anhydrous non-defibrillated cell wall material having a particle size of between 25 μm and 500 μm;
wherein the particulate anhydrous non-defibrillated cell wall material is dispersed in the oil phase in a concentration of 0.05 to 15 wt. %, by weight of the liquid oil; and wherein the savoury concentrate has a total structuring capacity (TSC) in the range of 2-15;

$$TSC = N_{20} + A_{cwm} \ast C_{cwm}$$

wherein:
  $A_{cwm}$ is defined as oil structuring capacity of the particulate anhydrous non-defibrillated cell wall material, $A_{cwm}$ equaling 4 in case the particulate anhydrous non-defibrillated cell wall material originates from stem tissue of monocotyledon plants, and $A_{cwm}$ equaling 0.6 if the particulate cell wall material originates from parenchymal plant tissue;
  $C_{cwm}$ is defined as concentration (in wt. %) of the particulate anhydrous non-defibrillated cell wall material by weight of the liquid oil.

2. Savoury concentrate according to claim 1, wherein fat in the oil phase has a solid fat content at 20° C. ($N_{20}$) of 0-15% by weight and a liquid oil content at 20° C. that equals 100% —$N_{20}$.

3. Savoury concentrate according to claim 1, wherein the savoury concentrate comprise 33-75 wt. % of the oil phase.

4. Savoury concentrate according to claim 1, wherein the particulate anhydrous non-defibrillated cell wall material is parenchymal cell wall material.

5. Savoury concentrate according to claim 4, wherein the parenchymal cell wall material originates from carrot, cucumber, sugar beet, apple, pear, leek, celery, pumpkin, kiwi, strawberry, papaya, pine apple, prune, melon, apricot, grapes onion, tomato, potato, cabbage, coconut, or combinations thereof.

6. Savoury concentrate according to claim 4, wherein the particulate anhydrous non-defibrillated cell wall material is dispersed in the oil phase in a concentration of 0.1-4%, by weight of the liquid oil.

7. Savoury concentrate according to claim 1, wherein the particulate anhydrous non-defibrillated cell wall material is cell wall material originating from the stems of monocotyledon plants.

8. Savoury concentrate according to claim 7, wherein the cell wall material originates from stems of wheat, oat, rye, spelt or a combination thereof.

9. Savoury concentrate according to claim 6, wherein the particulate anhydrous non-defibrillated cell wall material is dispersed in the oil phase in a concentration of 0.5-15%, by weight of the liquid oil.

* * * * *